United States Patent [19]

Shibata

[11] 4,232,812

[45] Nov. 11, 1980

[54] APPARATUS FOR MAKING A TRI-METALLIC COMPOSITE ELECTRICAL CONTACT

[75] Inventor: Akira Shibata, Yokohama, Japan

[73] Assignee: Chugai Denki Kogyo Kabushiki-Kaisha, Japan

[21] Appl. No.: 926,874

[22] Filed: Jul. 24, 1978

[30] Foreign Application Priority Data

Jul. 25, 1977 [JP] Japan ................................ 52-88285

[51] Int. Cl.[3] ............................................ B23K 20/02

[52] U.S. Cl. ....................................... 228/3.1; 29/882; 228/5.1; 10/12 R

[58] Field of Search ............ 29/630 C; 10/12 R, 12.5, 10/15; 228/3.1, 5.1

[56] References Cited

U.S. PATENT DOCUMENTS

| | | | |
|---|---|---|---|
| 3,371,414 | 3/1968 | Gwyn, Jr. | 29/630 C |
| 3,547,334 | 12/1970 | Gwyn, Jr. | 29/630 C |
| 3,612,812 | 10/1971 | Wacker et al. | 29/630 C X |
| 3,634,934 | 1/1972 | Fitzgerald | 29/630 C |
| 3,635,389 | 1/1972 | Shibata | 228/3.1 |
| 4,073,425 | 2/1978 | Bollian | 228/3.1 X |

FOREIGN PATENT DOCUMENTS

| | | | |
|---|---|---|---|
| 1135272 | 8/1962 | Fed. Rep. of Germany | 29/630 C |
| 1243746 | 9/1960 | France | 29/630 C |
| 1075107 | 7/1967 | United Kingdom | 10/12 R |

*Primary Examiner*—Francis S. Husar
*Assistant Examiner*—C. J. Arbes
*Attorney, Agent, or Firm*—Shlesinger, Fitzsimmons & Shlesinger

[57] ABSTRACT

A tri-metallic electrical contact consisting of a head wire piece and a base wire piece which abut to an intermediate piece at its opposite ends, is produced by cold press operations performed by first and second die and punch sets. The first die and punch set causes plastic deformation of approximately only a half part of the aligned wire pieces, while keeping another half part of these pieces not deformed. The second die and punch set imparts, subsequent to, and independently from, the cold press operation performed by the first die and punch set, plastic deformation to the other half part of the pieces, whereby the abutting surfaces of the three wires are prevented from sliding movements laterally relative to each other during the cold press operations, and whereby irregular or insufficient deformation of the wires due to the differences of yield points of the wires is prevented.

9 Claims, 13 Drawing Figures

APPARATUS FOR MAKING A TRI-METALLIC COMPOSITE ELECTRICAL CONTACT

This invention relates to an apparatus for manufacturing a tri-metallic composite electrical contact which consists of a stem, and a head and base which are cold butted to the opposite ends of stem.

In the operation of conventional apparatus for manufacturing a tri-metallic contact, three cut wires and aligned coaxially with their freshly sheared surfaces abutting to each other; and they are subjected, together and simultaneously, to an axial force provided by an opposed die and punch set. This axial force generates stresses normal to the component wires along their longitudinal axes, whereby the normal stresses, which are changed to tangential stresses, cause plastic deformation of the cut wires. These deformations join the cut wires into an integral composite contact. However, such tangential stresses in the cut wires sometimes cause undesirable lateral sliding of the abutting wire surfaces relative to each other, whereby axial alignment of the wires and portions of their freshly sheared surfaces are largely damaged. Such tangential stresses are produced, moreover, unevenly or insufficiently throughout the wires, due to differences of their yield points and lengths.

The apparatus made in accordance with this invention is characterized by the fact that three pieces of wire, which are axially aligned, are subjected to a first pressing operation performed by a first die and punch set, whereby a first piece of wire (one of the end or outer pieces) and a part of the intermediate wire are joined together as the result of plastic deformation which is caused therebetween, while the third piece of wire (the other end piece) and another part of the intermediate wire are kept rigidly supported. Thereafter a second die and punch set produces, independently of the first set, plastic deformation between said third piece of wire and said other part of the intermediate wire, while maintaining said first piece of wire and the first-named part of said intermediate wire, which have been deformed and joined, rigidly supported.

It is also characterized in that the die of the first die and punch set may be the same as the die of the second set.

In order to explain this invention more in detail, the reference is made hereinunder to the accompanying drawings.

Figure 5:
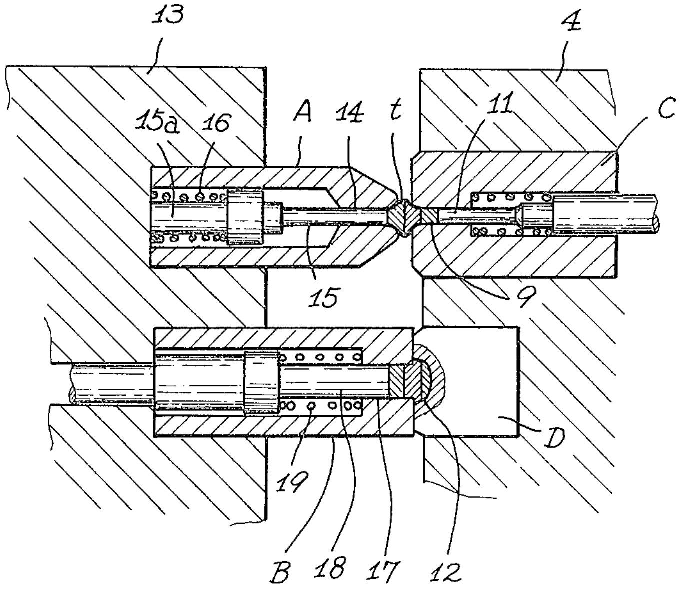
Figure 5A:
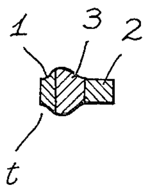
Figure 8:
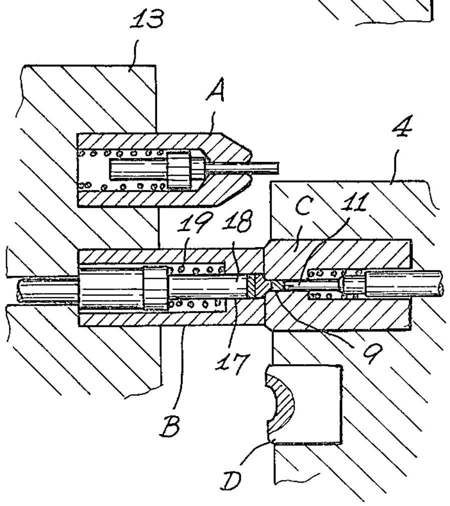
Figure 8A:
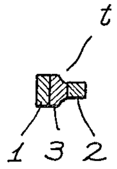
Figure 9:
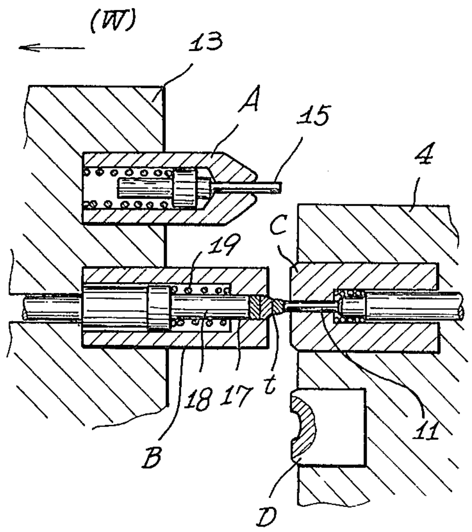
Figure 9A:
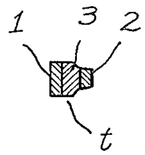
Figure 10:
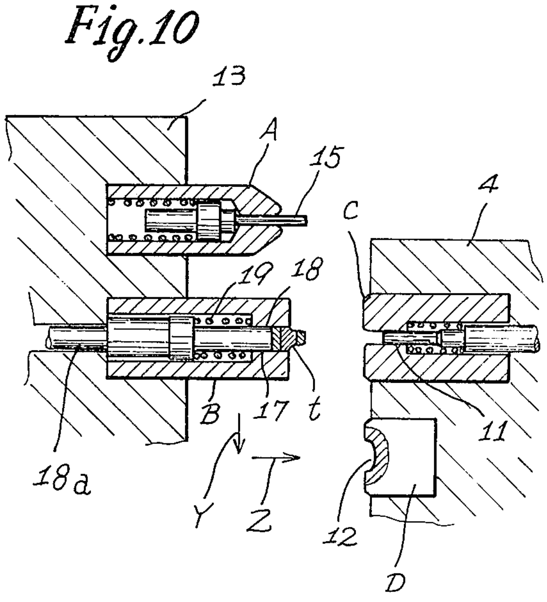

FIG. 5, 6, 7, 8, 9, and 10 are illustrations showing various stages of operation of this apparatus; and FIGS. 5*a*, 8*a*, and 9*a* are axial section views showing the configuration of the contact at different stages of its manufacture by this apparatus.

Figure 2:
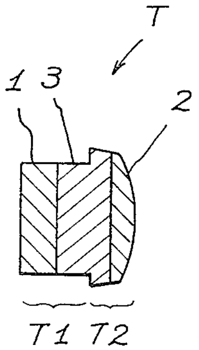
FIG. 2 is an axial sectional view of one type of tri-metallic electrical contact which can be made with the apparatus shown in FIG. 1.

As aforementioned briefly, this apparatus is for making a tri-metallic electrical contact T such as shown in FIG. 2, in which the contact consists of a base 1 made of a precious metal such as a silver alloy, a head 2 also made of a precious metal, and a stem 3 made of a non-precious metal such as copper. T1 in FIG. 2 of the drawing represents a shank portion of contact T, which consists of the base 1 and a portion of the stem 3, and T2 represents a contact portion which consists of the head 2 and another part of the stem 3. This contact, as shown in its unfinished form in other FIGS. of the drawing (i.e., during its manufacture) is indicated by the letter t.

Figure 3:
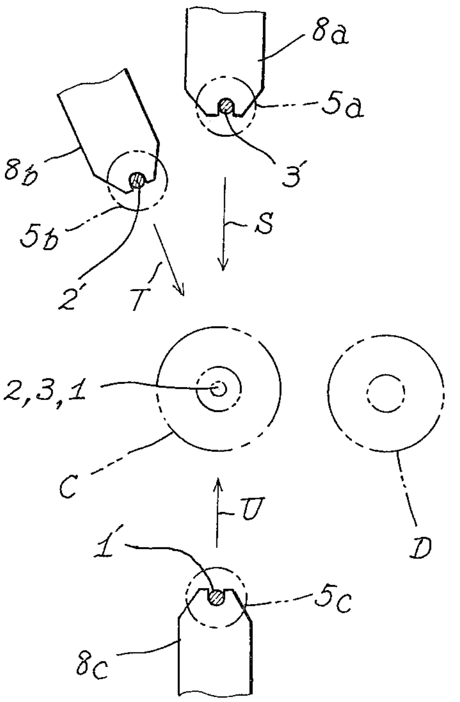
FIG. 3 is a fragmental end view of this apparatus.

With reference to FIG. 3, in which an arrangement of stationary components of the apparatus are illustrated schematically by broken lines, C denotes a first die, D a second die, and 5*a*, 5*b*, 5*c* denote three wire-supplying pipes which are fixed to a support block 4, so that the second die is located laterally to one side of the first die with a distance therebetween, and so that the supply pipes are located radially outwardly from the first die C. Structures of the first die C and the three wire-supplying pipes 5*a*, 5*b*, 5*c* are illustrated more in detail in FIG. 1, which is a sectional side elevational view of FIG. 3.

Figure 1:
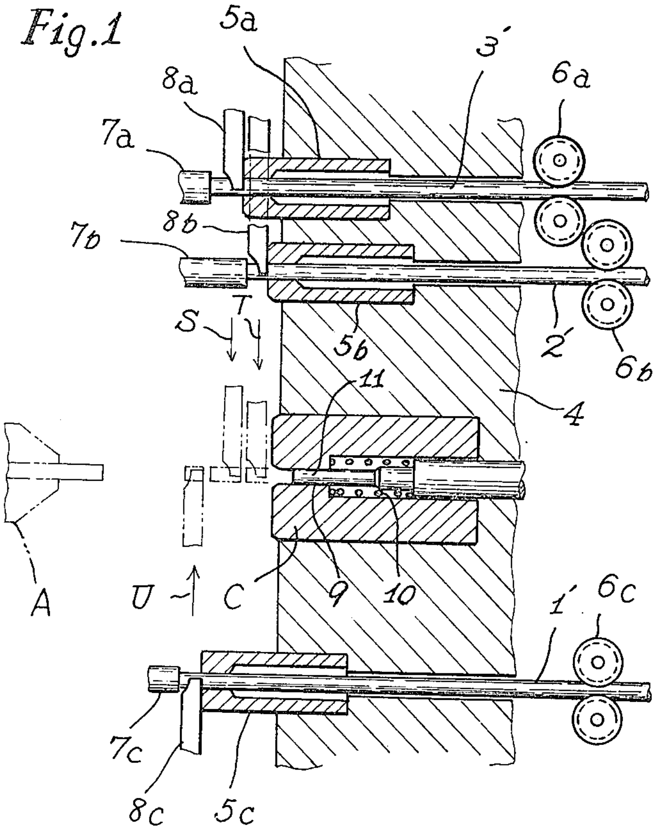
FIG. 1 is a fragmentary side elevational view showing in section a portion of the apparatus used for producing a tri-metallic electrical contact made according to one embodiment of this invention.

Each of the wire-supplying pipes 5*a*, 5*b*, 5*c* receives therein a wire 3′, 2′, 1′, which corresponds, respectively, to the stem 3, the head 2 and the base 1 of the complete contact T, and which is fed into the associated pipes 5*a*, 5*b*, and 5*c* by means of feed rollers 6*a*, 6*b*, or 6*c*, respectively. Opposite the forward ends of the wire-supplying pipes 5*a*, 5*b*, and 5*c* there are positioned stoppers 7*a*, 7*b*, 7*c*, which are spaced predetermined distances from the registering ends of the supply pipes. The lengths and locations of the wires 3′, 2′, and 1′, which are drawn out between the forward ends of the wire-supplying pipes and their associated stoppers, are such that when they are shifted radially onto the axial center line of the die C, as noted hereinafter, they are aligned coaxially upon said center line. Numerals 8*a*, 8*b*, 8*c* denote cutters which slide radially along the forward ends of the wire-supplying pipes so as to cut the wires 3′, 2′, 1′, and then to transfer the cut wires into registry with the center line of the die C, and in the order or succession of the cut wires 2, 3, 1 as seen when reading from the right to the left from the die C as shown in FIG. 1.

Figure 4:
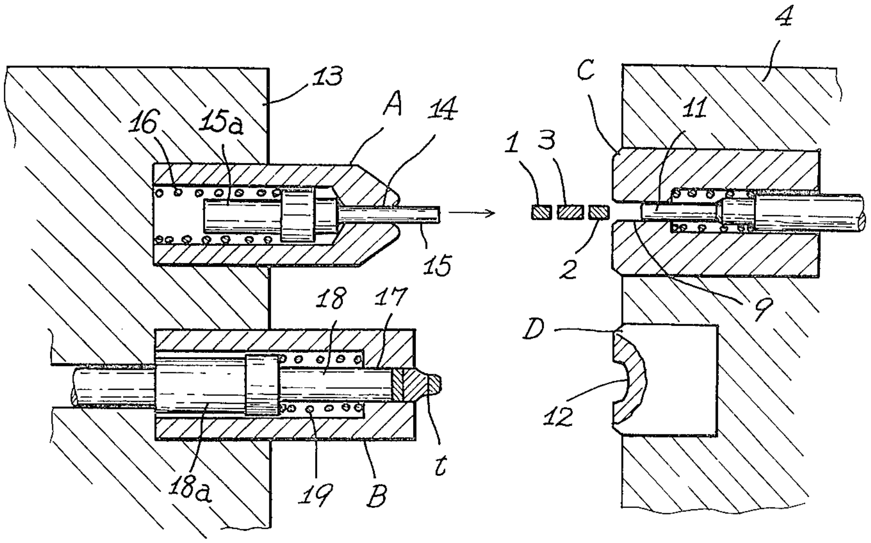
FIG. 4 is a side elevational view, in section, of additional parts of this apparatus.

The die C has an axially entending bore 9 provided at its outer end with a rounded or tapered opening, and opening at its inner end on a counter bore containing a compression spring 10. An ejector pin 11 is slidably mounted at its forward end in the axial hole 9, and is normally positioned at a position in which the spring 10 is extended, or is not compressed. As best shown in FIG. 4, the second die D has at its open end a cavity 12 which corresponds to the configuration of the contact portion T2 of the contact shown in FIG. 2.

At the left side of the support block 4 there is provided, s best shown in FIG. 4, a movable punch support block 13, which is vertically movable into and out of spaced registry with the dies C and D from a position located above the said dies. This punch support block 13 is fitted with spaced punches A and B. The punch block 13 is movable first to a position in which it registers with the die block 4 as illustrated in FIG. 4, and is then reciprocable towards the die block to the position shown in FIG. 5, and then away from the die block.

The punch A has an axial bore 14, which is rounded or tapered at its outer, free end, and which slidingly receives the forward end of a push pin 15. The push pin 15 projects from the free end of the axial bore 14 on account of a spring 16 which is mounted around the inner end 15*a* of pin 15 in a counterbore in punch A. Pin 15 is rectractable resiliently against said spring 16 and to an extent that its inner end 15*a* abuts against the bottom of the counterbore in punch A. The punch B also has an axially extending bore 17, through which a push pin 18 is resiliently mounted by a spring 19. The bore 17 has a cross sectional configuration corresponding to that of the contact portion T1 of the contact T as illustrated in FIG. 2.

The apparatus having the above construction operates as follows:

(1) Wire pieces 1 (for a base), 3 (for a stem), and 2 (for a head) are aligned between the first punch A and the first die C, as illustrated in FIG. 4, by means of the cutters 8*c*, 8*a*, 8*b* which are moved in directions U, S, T (FIG. 2). The punch A, which is brought to the position of FIG. 5 by its movement in the direction of the arrow in FIG. 4, compresses portions of the wires into the bore 9 of the first die C, whereby the wires are subjected to plastic deformation, except those portions (2 and part of 3) which are rigidly supported by the bore 9. The shape of contact t at this stage is as illustrated in FIG. 5*a*, wherein the wire piece 1 and the adjacent end of wire piece 3 are joined firmly as the result of plastic deformation which is caused therebetween, while the joint between the wire pieces 3 and 2 is only preliminary. Upon the reverse movement of the first punch A to its former (FIG. 4) position, or in a direction W (FIG. 6), the contact t remains in the first die C. Then the punch support block 13 is moved upwardly in a direction X (FIG. 7) to place punch B in registry with die C, and then is moved in a direction V. This movement of the block 13 forcibly presses the portion of the contact t which projects from the bore of the first die C, into the bore 17 of the second punch B, whereby the shank portion T1 is shaped as shown in FIGS. 8 and 8*a*.

(2) Referring to FIG. 9, there now causes the retraction of the block 13 in the direction W; and at the same time the pin 11 of the first die C is positively advanced out of the bore 9 of the die at a velocity higher than that of the retraction velocity of the block 13, whereby the said pin 11 occurs plastic deformation to occur between the portions of the contact t (2 and part of 3) which now project from the bore 17 in punch B. The contact t now assumes the configuration as illustrated in FIG. 9*a*. The head 2 is thereby firmly joined to the stem 3. The block 13 then moves to the direction Y (FIG. 10) back to the position shown in FIG. 4, and thereafter in a direction Z (FIG. 10) to the position illustrated in FIG. 5. The thus joined or assembled contact (FIG. 9*a*) is pressed between the second punch B and die D, whereby the contact portion T2 is finally shaped, and the contact T is thereafter released from the second punch B by the movement of the block 13 in the direction W (FIG. 6).

Figure 6:
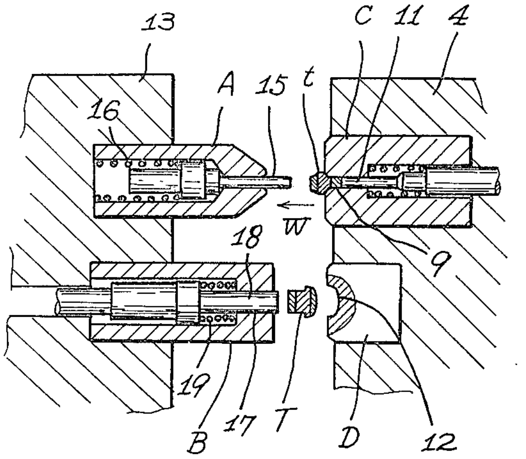
Figure 7:
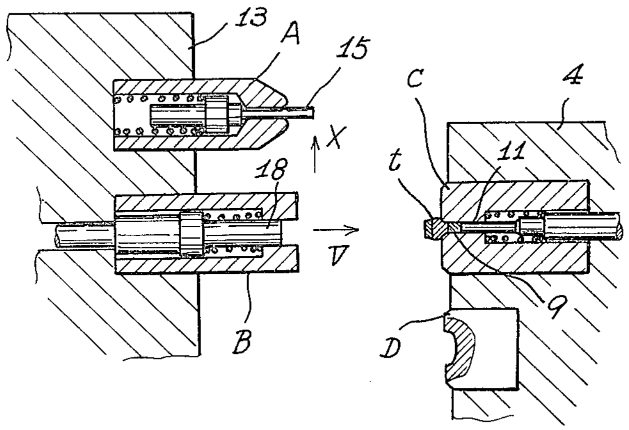

It shall be noted that while one contact t is under production, another or second contact t is being also produced, as illustrated in FIGS. 5 and 6. Note also that the confronting surfaces on punch B and die D (FIG. 5) are nearly engaged so that the entire outer surface of the contact is surrounded by die walls to prevent any undesirable lateral strain on the contact.

From the foregoing, it will be apparent that the apparatus and method disclosed herein provide improved means for manufacturing cold-pressed electrical contacts of the type described. Since the aligned wire sections are rigidly supported at least at one end during a cold-pressing operation, damage resulting from undesirable lateral sliding of confronting wire surfaces is minimized. Moreover, with applicant's invention it is possible simultaneously to produce at least two electrical contacts of the type described.

While this invention has been illustrated and described in detail in connection with only one embodiment thereof, it will be understood that it is capable of further modification and that this application is intended to cover any such modifications as may fall within the scope of one skilled in the art or the appended claims.

I claim:

1. Apparatus for making a tri-metallic electrical contact by cold pressing, comprising means for aligning a plurality of cut wires;

a first die and punch set having a first cavity for firmly sustaining therein the confronting end portions of a first pair of said aligned wires while the confronting end portions of a second pair of said aligned wires are disposed exteriorly of said first cavity, said die and said punch being movable one with respect to the other for causing plastic deformation between said confronting end portions of said second pair of said wires at the exterior of said first cavity, thereby to cold press the last-named end portions together along a first seam, means for transferring said aligned wires from said first die and punch set to a second die and punch set, said second die and punch set having a second cavity for firmly sustaining therein said first seam and said end portions of said second pair of aligned wires after transfer of said wires to said second die and punch set, and with said end portions of said first set of wires being disposed exteriorly of said second cavity, said die and said punch of said second set being movable one with respect to the other for causing plastic deformation in said confronting end portions of said first pair of aligned wires at the exterior of said second cavity thereby to cold press together the confronting end portions of said first pair of wires along a second seam, and said means for transferring said aligned wires being operative to transfer said first seam and end portions of said second pair of wires directly to said second cavity while said confronting end portions of said first pair of wires are still in said first cavity.

2. Apparatus as claimed in claim 1, wherein said transferring means comprises pins resiliently mounted in said first and second die and punch sets and engageable with one and the other end, respectively, of said aligned wires to eject the last-named ends from said cavities after the deformation of said projecting end portions of said wires.

3. Apparatus as claimed in claim 1, wherein part of the die of said first die and punch set functions also as a die of said second die and punch set, and one of said wires is common to each of said first and second pairs thereof.

4. Apparatus as claimed in claim 1, including a first member supporting the two dies of said first and second sets in spaced relation to each other, and a second member supporting the two punches of said first and second sets in spaced relation to each other, one of said members being reciprocable in a first direction selectively to place one of said punches in spaced, axial alignment with each of said dies, and in a second direction toward and away from said other member to effect said plastic deformation of the confronting end portions of said aligned wires projecting from said cavities.

5. Apparatus as claimed in claim 4, wherein said first cavity comprises an axial bore in one of said dies, and a pin is reciprocable in said bore in said one die between a retracted position within said bore, when said end portions of said first pair of wires is positioned therein, and an advanced position in which it projects from said bore to discharge the wires from said bore during movement of said one member away from said other member.

6. Apparatus as claimed in claim 5, wherein said second cavity comprises a bore in one of said punches and disposed to have said confronting end portions of said second pair of wires inserted therein during movement of said one member toward said other member.

7. Apparatus as claimed in claim 6, wherein said pin is moved to said advanced position at a rate faster than the rate at which said one member is moved away from said other member to effect plastic deformation of the confronting portions of said second pair of wires projecting from said bore in said one punch.

8. A method of fabricating a tri-metallic electrical contact by cold-pressing operations comprising placing three pieces of metal wire in axial alignment, cold pressing with a first punch one entire end piece of wire and only a first part of the middle piece of wire into a bore in a first die so that the confronting surfaces on the other end piece, and the projecting end of the remaining part of said middle piece, are secured together by plastic deformation, cold-pressing with a second punch said other end piece and said remaining portion of said middle piece into a bore in a second die so that the confronting surfaces on said one end piece, and on said first part of said middle piece of wire, are secured together by plastic deformation, and thereafter cold pressing said one end piece and the attached portion of said middle piece in a third die, while said other end piece and attached portion of said middle piece remain in said second die.

9. A method as defined in claim 8, wherein said second punch reciprocates in a bore in said first die and advances at one end out of the bore of said first die and toward said second die to effect the second-named cold pressing operation.

* * * * *

UNITED STATES PATENT OFFICE
CERTIFICATE OF CORRECTION

Patent No. 4,232,812 Dated November 11, 1980

Inventor(s) Akira Shibata

It is certified that error appears in the above-identified patent and that said Letters Patent are hereby corrected as shown below:

On the Title page, "9 claims" should read -- 7 claims --.

Column 6 cancel claims 8 and 9.

Signed and Sealed this

*Ninth* Day of *February 1982*

[SEAL]

*Attest:*

GERALD J. MOSSINGHOFF

*Attesting Officer* *Commissioner of Patents and Trademarks*